US011714496B2

(12) United States Patent
Vilermo et al.

(10) Patent No.: US 11,714,496 B2
(45) Date of Patent: Aug. 1, 2023

(54) APPARATUS, METHOD AND COMPUTER PROGRAM FOR CONTROLLING SCROLLING OF CONTENT

(71) Applicant: Nokia Technologies Oy, Espoo (FI)

(72) Inventors: Miikka Vilermo, Siuro (FI); Antti Eronen, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 59 days.

(21) Appl. No.: 16/760,256

(22) PCT Filed: Dec. 3, 2018

(86) PCT No.: PCT/IB2018/059581
§ 371 (c)(1),
(2) Date: Apr. 29, 2020

(87) PCT Pub. No.: WO2019/123062
PCT Pub. Date: Jun. 27, 2019

(65) Prior Publication Data
US 2021/0405771 A1     Dec. 30, 2021

(30) Foreign Application Priority Data
Dec. 21, 2017    (EP) .................................... 17209450

(51) Int. Cl.
*G06F 3/04815*     (2022.01)
*G06F 3/0485*      (2022.01)
(Continued)

(52) U.S. Cl.
CPC ............ *G06F 3/0346* (2013.01); *G06F 3/011* (2013.01); *G06F 3/0485* (2013.01); *G06F 3/04815* (2013.01); *G06T 15/00* (2013.01)

(58) Field of Classification Search
CPC ...... G06F 3/0346; G06F 3/011; G06F 3/0485; G06T 15/00
See application file for complete search history.

(56) References Cited

U.S. PATENT DOCUMENTS 8,508,475 B2 * 8/2013 Gear ...................... G06F 3/017
                                                           345/158
9,149,715 B2 * 10/2015 Abe ..................... A63F 13/5255
(Continued)

FOREIGN PATENT DOCUMENTS

WO     2017/164695 A1    9/2017

OTHER PUBLICATIONS

Y Du et al., Tilt & touch: Mobile phone for 3D interaction, 2011 (Year: 2011).*
(Continued)

*Primary Examiner* — Jordany Nunez
(74) *Attorney, Agent, or Firm* — Alston & Bird LLP

(57) ABSTRACT

An apparatus, method and computer program, the apparatus comprising: means for enabling three dimensional content to be rendered; means for determining movement of the apparatus; means for controlling scrolling of the three dimensional content, wherein if the movement of the apparatus is within a first category the three dimensional content is scrolled to correspond to the movement of the apparatus and if the movement of the apparatus is within a second category the three dimensional content is not scrolled.

20 Claims, 8 Drawing Sheets

Figure 1:
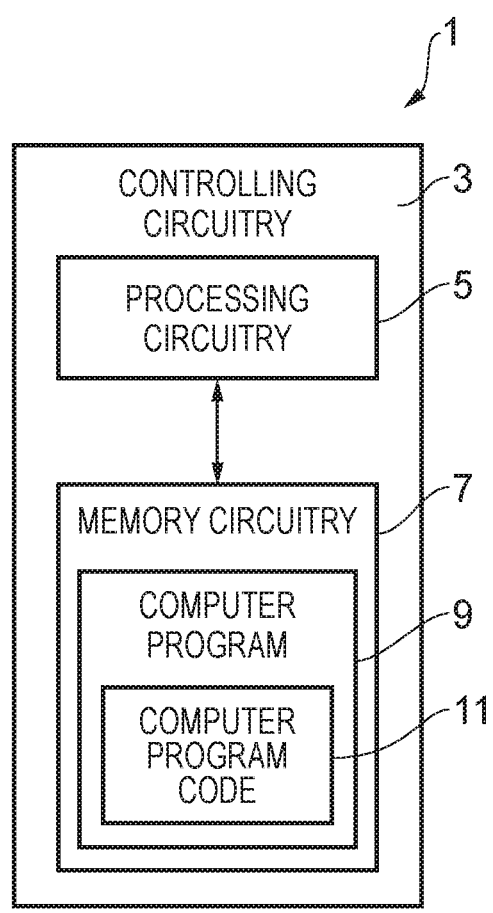

(51) Int. Cl.
*G06F 3/0346* (2013.01)
*G06F 3/01* (2006.01)
*G06T 15/00* (2011.01)

(56) References Cited

U.S. PATENT DOCUMENTS

| | | | | |
|---|---|---|---|---|
| 9,224,237 | B2* | 12/2015 | Costello | G06T 19/20 |
| 9,228,836 | B2* | 1/2016 | Girod | G01C 21/165 |
| 9,354,709 | B1* | 5/2016 | Heller | G06F 3/017 |
| 9,377,911 | B2* | 6/2016 | Oshita | G06F 3/04883 |
| 9,459,692 | B1* | 10/2016 | Li | G01S 5/163 |
| 9,652,031 | B1* | 5/2017 | Savastinuk | G06F 3/011 |
| 9,681,219 | B2* | 6/2017 | Vilermo | H04R 1/32 |
| 9,776,083 | B2* | 10/2017 | Takeda | H04N 21/42202 |
| 9,797,727 | B2* | 10/2017 | Georgy | G01C 21/16 |
| 10,643,391 | B2* | 5/2020 | Rober | B60W 10/18 |
| 10,915,165 | B2* | 2/2021 | Lusinchi | G06F 3/011 |
| 10,981,055 | B2* | 4/2021 | Stafford | A63F 13/213 |
| 2005/0185070 | A1* | 8/2005 | Cheatle | H04N 5/232945 |
| | | | | 348/239 |
| 2005/0212754 | A1* | 9/2005 | Marvit | G06F 1/1626 |
| | | | | 345/156 |
| 2007/0025723 | A1* | 2/2007 | Baudisch | G03B 17/18 |
| | | | | 396/287 |
| 2010/0053164 | A1* | 3/2010 | Imai | G06F 3/017 |
| | | | | 345/427 |
| 2010/0125816 | A1* | 5/2010 | Bezos | G06F 3/013 |
| | | | | 715/863 |
| 2010/0226487 | A1* | 9/2010 | Harder | G06F 1/325 |
| | | | | 379/202.01 |
| 2011/0248987 | A1* | 10/2011 | Mitchell | G06T 19/20 |
| | | | | 345/419 |
| 2012/0245839 | A1* | 9/2012 | Syed | G01C 21/165 |
| | | | | 701/408 |
| 2012/0274745 | A1* | 11/2012 | Russell | G06F 3/013 |
| | | | | 348/46 |
| 2013/0016102 | A1* | 1/2013 | Look | G06T 15/20 |
| | | | | 345/426 |
| 2013/0060467 | A1* | 3/2013 | Nash | G01C 21/12 |
| | | | | 701/500 |
| 2013/0091462 | A1* | 4/2013 | Gray | G06F 3/0482 |
| | | | | 715/810 |
| 2013/0262233 | A1* | 10/2013 | Bradley | H04W 4/12 |
| | | | | 705/14.64 |
| 2013/0267317 | A1* | 10/2013 | Aoki | H04N 13/30 |
| | | | | 463/32 |
| 2013/0290116 | A1* | 10/2013 | Hepworth | G06F 3/0482 |
| | | | | 705/14.73 |
| 2013/0322634 | A1* | 12/2013 | Bennett | G10L 21/00 |
| | | | | 381/17 |
| 2014/0016821 | A1* | 1/2014 | Arth | G06T 7/80 |
| | | | | 382/103 |
| 2015/0055821 | A1* | 2/2015 | Fotland | G06T 7/246 |
| | | | | 382/103 |
| 2015/0077323 | A1* | 3/2015 | Ramaswamy | G06F 3/0304 |
| | | | | 345/156 |
| 2015/0082145 | A1* | 3/2015 | Ames | G06F 3/0346 |
| | | | | 715/234 |
| 2015/0082180 | A1* | 3/2015 | Ames | G06F 3/04815 |
| | | | | 715/738 |
| 2015/0082181 | A1* | 3/2015 | Ames | G06F 3/0487 |
| | | | | 715/738 |
| 2015/0085076 | A1* | 3/2015 | Lockhart | H04N 13/376 |
| | | | | 348/46 |
| 2015/0097858 | A1* | 4/2015 | Miki | G09G 3/03 |
| | | | | 345/629 |
| 2015/0215532 | A1* | 7/2015 | Jafarzadeh | H04N 5/232945 |
| | | | | 348/36 |
| 2015/0317831 | A1* | 11/2015 | Ebstyne | G02B 27/0172 |
| | | | | 345/419 |
| 2016/0191796 | A1* | 6/2016 | Mate | G06T 3/0006 |
| | | | | 348/39 |
| 2018/0204380 | A1* | 7/2018 | Kumar | G06F 3/011 |
| 2018/0335312 | A1* | 11/2018 | Bennett | G06F 3/167 |
| 2021/0049925 | A1* | 2/2021 | Robinson | G06F 3/013 |

OTHER PUBLICATIONS

Office action received for corresponding European Patent Application No. 17209450.0, dated Apr. 6, 2020, 6 pages.
Xuan et al., "Making Indoor Maps with Portable Accelerometer and Magnetometer", Ubiquitous Positioning Indoor Navigation and Location Based Service, Oct. 14-15, 2010, 7 pages.
Extended European Search Report received for corresponding European Patent Application No. 17209450.0, dated Apr. 19, 2018, 8 pages.
International Search Report and Written Opinion received for corresponding Patent Cooperation Treaty Application No. PCT/IB2018/059581, dated Jan. 28, 2019, 14 pages.

* cited by examiner

APPARATUS, METHOD AND COMPUTER PROGRAM FOR CONTROLLING SCROLLING OF CONTENT

RELATED APPLICATION

This application claims priority to PCT Application No. PCT/IB2018/059581, filed on Dec. 3, 2018, which claims priority to European Application No. 17209450.0, filed on Dec. 21, 2017, each of which is incorporated herein by reference in its entirety.

TECHNOLOGICAL FIELD

Examples of the disclosure relate to an apparatus, method and computer program for controlling scrolling of content. In particular examples of the disclosure relate to an apparatus, method and computer program for controlling scrolling of three dimensional content.

BACKGROUND

Apparatus that enables three dimensional content to be rendered to a user are known. The three dimensional content may comprise visual content which represents a three dimensional visual space and/or audio content which represents a three dimensional audio space. When the three dimensional content is rendered the visual scene and/or the audio scene that is rendered may be dependent upon a position of the user. This enables different visual scenes and/or different audio scenes to be rendered where the visual scenes and/or audio scenes correspond to different positions of the user.

The three dimensional content may be used in virtual reality or augmented reality applications or any other suitable type of applications.

BRIEF SUMMARY

According to various, but not necessarily all, examples of the disclosure there is provided an apparatus comprising: means for enabling three dimensional content to be rendered; means for determining movement of the apparatus; means for controlling scrolling of the three dimensional content, wherein if the movement of the apparatus is within a first category the three dimensional content is scrolled to correspond to the movement of the apparatus and if the movement of the apparatus is within a second category the three dimensional content is not scrolled.

Determining movement of the apparatus may comprise determining a path of the apparatus and comparing the expected accelerations for an apparatus following the determined path to measured accelerations of the apparatus. The second category of movement may correspond to the accelerations caused by the apparatus following the determined path. The first category of movement may correspond to accelerations that are not caused by the apparatus following the determined path.

The determined path may correspond to a path of a moving vehicle within which the apparatus is located.

The movement of the apparatus in both the first category and the second category may comprise a change in orientation of the apparatus.

The first category of movement may comprises change in position of the apparatus relative to a user of the apparatus and the second category of movement comprises movement of the apparatus which does not change the position of the apparatus relative to a user of the apparatus.

The means for enabling three dimensional content to be rendered may be arranged to enable two dimensional content and three dimensional content to be displayed simultaneously and the means for enabling scrolling through the three dimensional content is arranged to control the scrolling of the three dimensional content so that the two dimensional content continues to be displayed if the movement of the apparatus is within a second category. The means for enabling scrolling through the three dimensional content may be arranged to fix the two dimensional content in position on a display. The apparatus may comprise means for detecting a user input and in response to the detected user input moving the two dimensional content from the fixed position.

The apparatus may comprise means for classifying movement of the apparatus as first category or second category.

The three dimensional content may comprise visual content and the rendering of the three dimensional content comprises displaying the images on one or more displays.

According to various, but not necessarily all, examples of the disclosure there is provided an apparatus comprising: processing circuitry; and memory circuitry including computer program code, the memory circuitry and the computer program code configured to, with the processing circuitry, cause the apparatus to: enable three dimensional content to be rendered; determine movement of the apparatus; control scrolling of the three dimensional content, wherein if the movement of the apparatus is within a first category the three dimensional content is scrolled to correspond to the movement of the apparatus and if the movement of the apparatus is within a second category the three dimensional content is not scrolled.

According to various, but not necessarily all, examples of the disclosure there is provided an electronic device comprising an apparatus as described above.

According to various, but not necessarily all, examples of the disclosure there is provided a method comprising: enabling three dimensional content to be rendered; determining movement of the apparatus; controlling scrolling through the three dimensional content, wherein if the movement of the apparatus is within a first category the three dimensional content is scrolled to correspond to the movement of the apparatus and if the movement of the apparatus is within a second category the three dimensional content is not scrolled.

According to various, but not necessarily all, examples of the disclosure there is provided a computer program comprising computer program instructions that, when executed by processing circuitry, cause: enabling three dimensional content to be rendered; determining movement of the apparatus; controlling scrolling through the three dimensional content, wherein if the movement of the apparatus is within a first category the three dimensional content is scrolled to correspond to the movement of the apparatus and if the movement of the apparatus is within a second category the three dimensional content is not scrolled.

According to various, but not necessarily all, examples of the disclosure there is provided examples as claimed in the appended claims.

BRIEF DESCRIPTION

Figure 2:
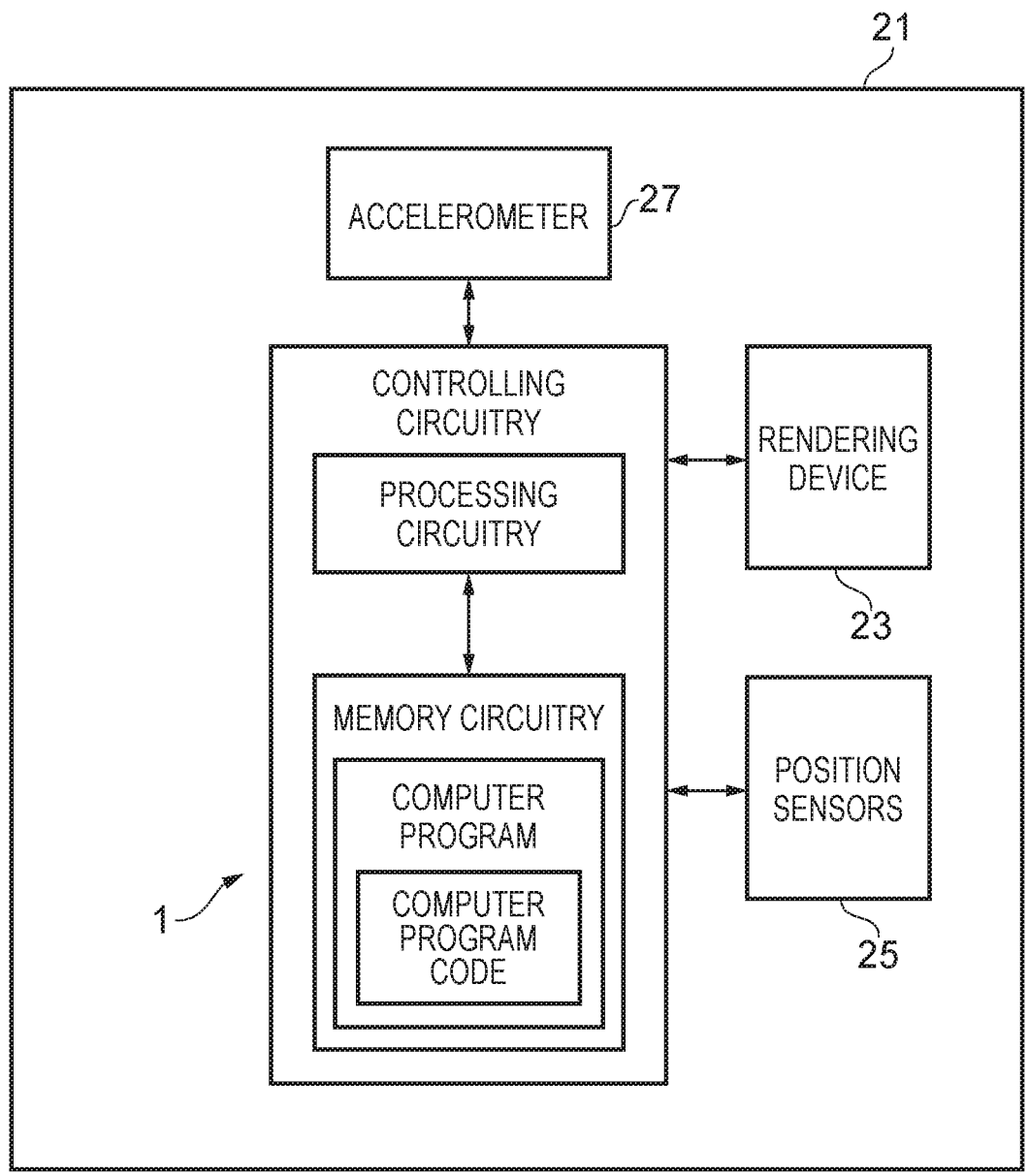
Figure 3:
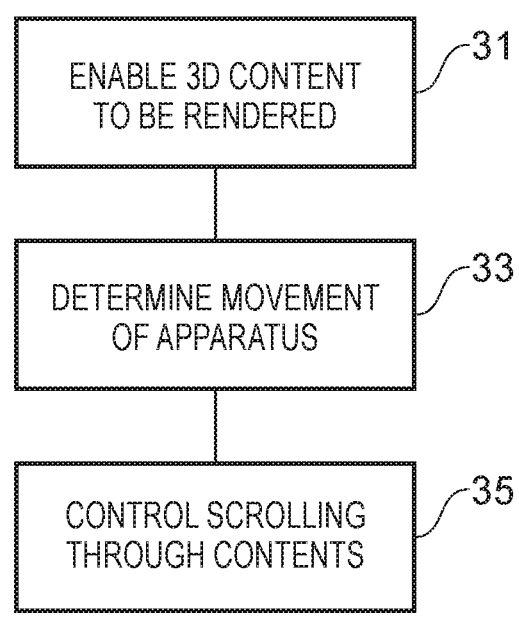
Figure 4:
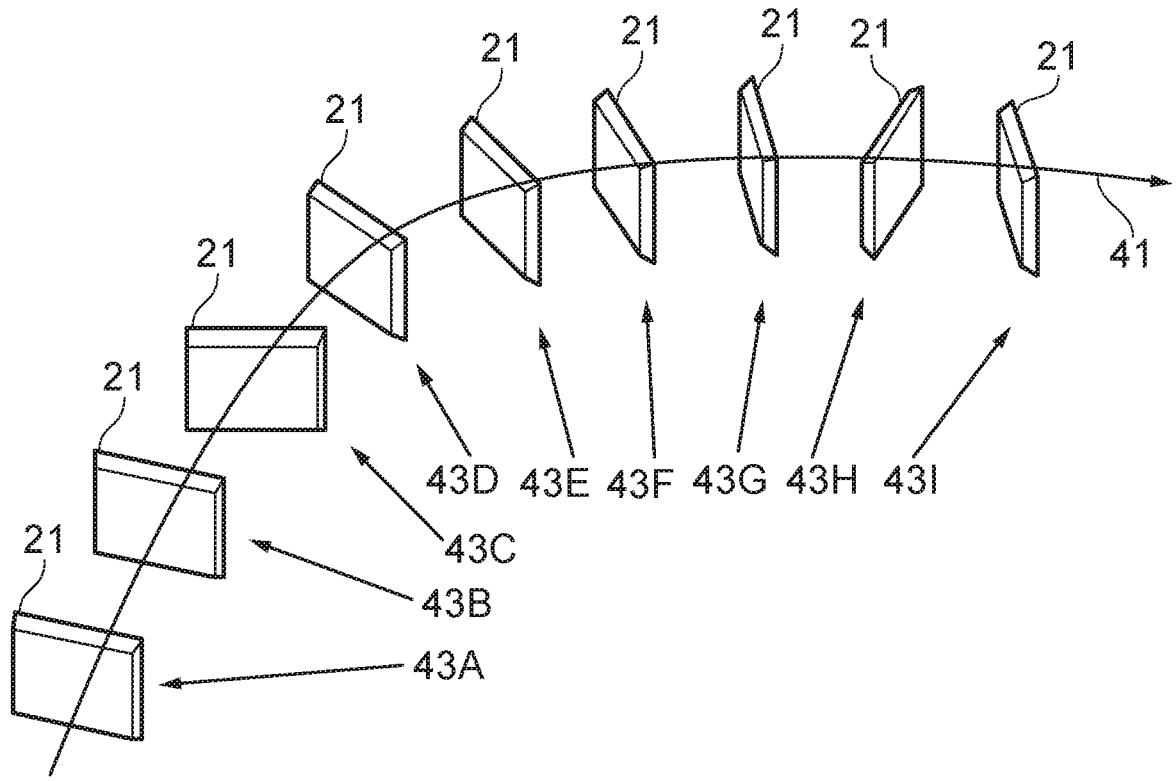
Figure 5:
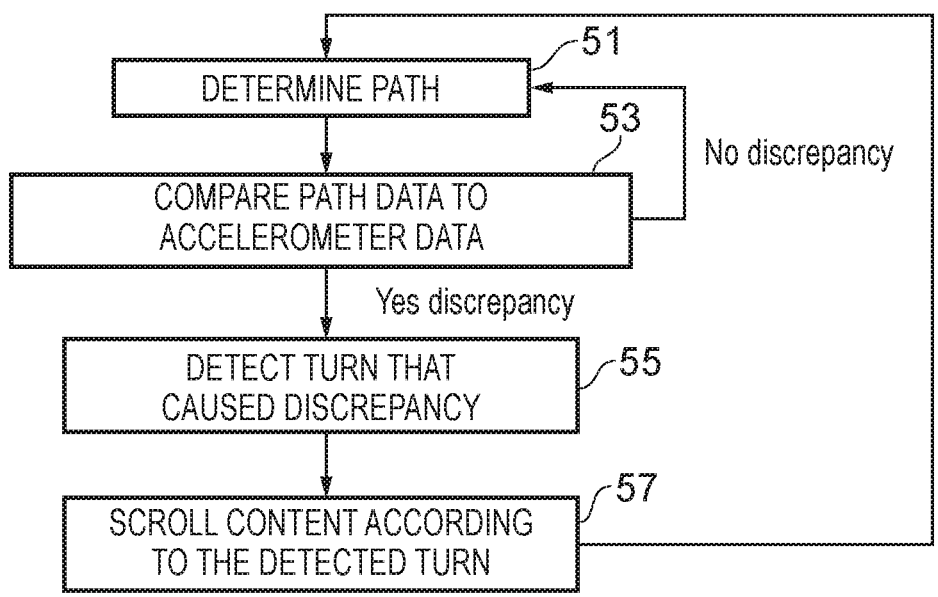

For a better understanding of various examples that are useful for understanding the detailed description, reference will now be made by way of example only to the accompanying drawings in which:

FIG. 1 illustrates an apparatus;
FIG. 2 illustrates an electronic device;
FIG. 3 illustrates a method;
FIG. 4 illustrates an example electronic device in use;
FIG. 5 illustrates another example method; and
FIGS. 6A to 6D illustrate an example electronic device in use.

DETAILED DESCRIPTION

The following description describes apparatus 1, methods, and computer programs 9 that control the rendering of content such as three dimensional content. In particular they control scrolling of the three dimensional content so that movements of the apparatus 1 that are not intended to cause scrolling of the three dimensional content can be ignored.

FIG. 1 schematically illustrates an apparatus 1 according to examples of the disclosure. The apparatus 1 illustrated in FIG. 1 may be a chip or a chip-set. In some examples the apparatus 1 may be provided within devices such as a content rendering device.

The apparatus 1 comprises controlling circuitry 3. The controlling circuitry 3 may provide means for controlling an electronic device 21 such as a content capturing device, a content processing device, a content rendering device or any other suitable type of device. The controlling circuitry 3 may also provide means for performing the methods, or at least part of the methods, of examples of the disclosure.

The apparatus 1 comprises processing circuitry 5 and memory circuitry 7. The processing circuitry 5 may be configured to read from and write to the memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods described above. The processing circuitry 5 by reading the memory circuitry 7 is able to load and execute the computer program 9.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal. In some examples the computer program code 9 may be transmitted to the apparatus 1 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

FIG. 2 illustrates an example electronic device 21 which may be used in examples of disclosure.

The example electronic device 21 comprises an apparatus 1 which may be as shown in FIG. 1. Corresponding reference numerals are used for corresponding features.

The electronic device 21 could be a content rendering device. In some examples the electronic device 21 could be a hand held device such as mobile telephone or tablet. In such examples a user of the electronic device could hold the electronic device 21 in their hand while the content is being rendered. In some examples the electronic device 21 could be a wearable device. For example the electronic device 21 could comprise a head set or near eye display or any other suitable wearable device.

In the example of FIG. 2 the electronic device 21, comprises one or more rendering devices 23, one or more positioning sensors 25 and one or more accelerometers 27. It is to be appreciated that only components of the electronic device 21 which are necessary for the following description have been shown in FIG. 2 and that in examples of the disclosure the electronic device 21 may comprise additional components. For example the electronic device 21 may comprise power supplies, user interfaces and any other necessary components.

In the example electronic device 21 of FIG. 2 the rendering device 23 is arranged to read to and write from the processing circuitry 5 within the apparatus 1. This may enable the apparatus 1 to control the content that is rendered by the rendering device 23.

The rendering device 23 may comprise any means which may be arranged to enable content to be rendered to a user of the electronic device 21. The rendering device may comprise means for enabling three-dimensional content to be rendered to the user. The rendering of the content may comprise providing the content in a form that can be perceived by the user.

In some examples the three-dimensional content may comprise visual content. In such examples the rendering device 23 may comprise one or more displays which may be arranged to display images representing the three-dimensional visual content. The displays could be touch screen displays, near eye displays provided in a headset or any other suitable type of displays.

In some examples the three-dimensional content may comprise audio content. In such examples the rendering device 23 may comprise one or more headphones, one or more loudspeakers or any other rendering device which enables an audible signal to be provided to a user of the electronic device 21.

The three dimensional content that is rendered by the rendering device 23 represents a virtual space. The virtual space could be an audio space, a visual space or a combination of an audio and visual space. Different audio and visual scenes may be available within the virtual space. The different visual scenes may comprise different representations of the visual space as viewed from particular points of view within the virtual space. The different audio scenes may comprise different audio representations of the audio space as listened to from particular points of view within the audio space.

The three-dimensional content may be perspective mediated content such that the point of view of the user within the virtual spaces represented by the three-dimensional content controls the visual and/or audio scenes that are rendered by the rendering device 23. For instance, if a user of the electronic device 21 rotates the electronic device 21 this can change the visual scenes and/or audio scenes that are rendered to the user by the rendering device 23.

In some examples the three-dimensional content could be mediated reality content. This could be content which enables the user to visually experience a fully or partially artificial environment such as a virtual visual scene or a virtual audio scene or a combination of a virtual visual scene and a virtual audio scene. The mediated reality content could comprise interactive content such as a video game or could comprise non-interactive content such as a motion video or an audio recording. The mediated reality content could be augmented reality content virtual reality content or any other suitable type of content.

In some examples the three-dimensional content may represent a continuous virtual space. Such content may have been captured by capturing devices which enable content to be captured in 360°. In such examples the apparatus 1 may enable continuous scrolling through the three dimensional content.

In other examples the three-dimensional content may comprise one or more discontinuous virtual spaces. Such content may have been captured by two or more capturing devices which enable different scenes of the same space to be captured. For example an electronic device 21 could have a front facing camera and a rear facing camera which could capture visual scenes from the front and rear of the electronic device. In such examples the apparatus 1 may enable dis-continuous scrolling through the three dimensional content. In such examples scrolling through the three dimensional content could comprise switching between the available audio and/or visual scenes.

In the example electronic device 21 of FIG. 2 the one or more positioning sensors 25 are also arranged to read to and write from the processing circuitry 5 within the apparatus 1. This may enable the apparatus 1 to control the one or more positioning sensors 25. This may also enable data that is obtained by the one or more positioning sensors 25 to be provided to the apparatus 1. This data could then be used by the processing circuitry 5 to determine movement of the apparatus 1.

The one or more positioning sensors 25 may comprise any means which enable the position of the electronic device 21, and therefore the apparatus 1 within the electronic device 21 to be determined.

In some examples the one or more positioning sensors 25 may a geographical location of the electronic device 21 to be determined. The geographical location of the electronic device 21 could be determined using Global Positioning System (GPS), or any other suitable means.

In some examples the one or more positioning sensors 25 could be arranged to enable an indoor position of the electronic device 21 to be determined. In such examples the position of the electronic device 21 could be determined using a local wireless network such as Bluetooth transmitters, an indoor positioning system such as High Accuracy Indoor Positioning systems (HAIP) or any combination thereof.

The one or more positioning sensors 25 may be coupled to the apparatus 1 to enable data obtained by the one or more positioning sensors 25 to be provided to the apparatus 1. This may enable the data to be stored in the memory circuitry 7. The data that is stored in the memory circuitry 7 may be accessed by the processing circuitry 5 to enable a path that has been followed by the electronic device 21 to be determined.

In the example electronic device 21 of FIG. 2 the one or more accelerometers 27 are also arranged to read to and write from the processing circuitry 5 within the apparatus 1. This may also enable data that is obtained by the one or more accelerometers 27 to be provided to the apparatus 1. This data could then be used by the processing circuitry 5 to determine movement of the apparatus 1.

The one or more accelerometers 27 may comprise any means which may be arranged to detect acceleration of the electronic device 21 and therefore accelerations of the apparatus 1 within the electronic device 21. The one or more accelerometers 27 may comprise micro-electromechanical devices or any other suitable type of device.

The one or more accelerometers 27 may be arranged to detect accelerations of the electronic device 21 which may be caused by rotation of the electronic device 21. This enables rotation of the apparatus 1 to be detected. The one or more accelerometers 27 may enable rotation about different axes to be determined. In some examples the one or more accelerometers 27 may be arranged to detect accelerations about three perpendicular axes. This may enable the roll pitch and yaw of the apparatus 1 to be measured.

The one or more accelerometers 27 may be coupled to the apparatus 1 to enable data obtained by the one or more accelerometers 27 to be provided to the apparatus 1. This may enable the data to be stored in the memory circuitry 7. The data that is stored in the memory circuitry 7 may be accessed by the processing circuitry 5 to enable the measured accelerations to be compared to be compared to the expected accelerations for a determined path of the apparatus 1. Any differences between the expected accelerations and the measured accelerations may be used, by the controlling circuitry 3, to categorize the movement of the apparatus 1.

In some examples the one or more accelerometers 25 may also provide a positioning sensor 25. The accelerometer may be arranged to detect changes in position which may enable a path or trajectory of the apparatus 1 to be determined.

FIG. 3 illustrates an example method of controlling the scrolling of three dimensional content which may be implemented using the apparatus 1 and electronic devices 21 as described. The method comprises, at block 31, enabling three-dimensional content to be rendered. The rendering of the three-dimensional content may comprise rendering visual content and/or rendering audio content. The enabling of the rendering of the three-dimensional content may comprise providing the three-dimensional content to the rendering device 25 of the electronic device 21 so that the three-dimensional content can be rendered into a format that can be perceived by the user.

At block 33 the method comprises determining movement of the apparatus 1. The movement of the apparatus 1 occurs while the three dimensional content is being rendered.

In some examples determining movement of the apparatus may comprise determining that an electronic device 21 comprising the apparatus 1 has moved and inferring the movement of apparatus 1 from the movement of the electronic device 21.

In some examples the movement of the apparatus 1 may comprise rotation of the apparatus 1 which changes the angular position of the apparatus 1. The rotation of the apparatus 1 could be rotation around more than one axes. In some examples the rotation could be about three perpendicular axes.

In some examples the movement of the apparatus 1 may comprise translation of the apparatus 1 which changes the location of the apparatus 1. The translation of the apparatus 1 could comprise movement along any of the three perpendicular axes.

In examples of the disclosure, determining movement of the apparatus 1 may comprise obtaining data from the one or more positioning sensors 25 and/or the one or more accelerometers 27 and using this obtained data to identify whether or not the apparatus 1 has changed angular position and/or location.

In some examples determining movement of the apparatus 1 may comprise differentiating between movement of the apparatus 1 which has been intended to cause scrolling of the three dimensional content and other types of movement of the apparatus 1. For example it may comprise differentiating between movements of the apparatus 1 caused by a user rotating an electronic device 21 in their hands and the movement of the apparatus 1 caused by a user walking or travelling within a vehicle. In some examples it may comprise differentiating between movement of the electronic device 21 in the user's hands and movement of the user as the user moves between different positions. For example a user could move between sitting and standing positions or between sitting and lying positions, or between other positions, while rendering content via the electronic device 21. This change in position could be for comfort rather than for enabling scrolling of content.

In some examples the apparatus 1 may differentiate between movement of the apparatus 1 which has been intended to cause scrolling of the three dimensional content and other types of movement of the apparatus 1 by determining a path of the apparatus 1 and comparing the expected accelerations for an apparatus 1 following the determined path to measured accelerations of the apparatus 1. Data obtained by the one or more positioning sensors 25 and the one or more accelerometers 27 may be used to enable this differentiation.

At block 35 the method comprises controlling scrolling through the three dimensional content. The scrolling of the content may be controlled based on the movement of the apparatus 1. If the movement of the apparatus 1 is determined to be within a first category then the three dimensional content may be scrolled to correspond to movement of the apparatus 1. That is the visual and/or audio scene may be changed to correspond to the change in location and/or angular position of the apparatus 1. If the movement of the apparatus is determined to be within a second category then the three dimensional content is not scrolled. In such cases the movement of the apparatus 1 would be ignored and there would be no change in the visual and/or audio scene corresponding to the change in location and/or angular position of the apparatus 1.

In some examples the first category of movement may correspond to movement which has been intended to cause scrolling of the content while the second category of movement could comprise all other movements of the apparatus 1. For example the first category of movement could comprise movement of the apparatus 1 which has been intentionally caused by the user of an electronic device 21 while the second category of movement could comprise incidental movement caused by the movement of the user between different positions.

In examples of the disclosure where the apparatus 1 compares expected accelerations for an apparatus following the determined path to measured accelerations of the apparatus the first category of movement could correspond to accelerations that are not caused by the apparatus 1 following the determined path while the second category of movement could correspond to accelerations that are caused by the apparatus 1 following the determined path.

In some examples the determined path could correspond to the path of a moving vehicle within which the apparatus 1 is located. For example a user could be travelling in a bus or train or other type of vehicle while consuming the three dimensional content. In such examples the movements that are in the second category and that are ignored for the purposes of scrolling through the content could comprise movements having a magnitude of the order of kilometres.

In some examples the determined path could correspond to a path caused by translational movement of the user. For example a user could be walking or running while listening to three dimensional audio content. In such examples the range of movement of the apparatus 1 could be in the order of tens or hundreds of meters.

In some examples the determined path could correspond to a path caused by the user changing their own position. For example it could correspond to a user moving between sitting and lying down or moving between standing up and sitting down. This movement would be intended to make the user more comfortable and not necessarily to change the content being rendered. In such examples the range of movement of the apparatus 1 could be in the order of a meter.

The movements of the apparatus 1 that are classified as being in the first category could comprise the user intentionally moving the electronic device 21. Where the electronic device 21 comprises a hand held electronic device 21 the movement could be the user tilting or rotating the electronic device 21 in their hand. In some examples it could comprise a change in the position of the apparatus 1 relative to the user of the apparatus 1. For example the movement may comprise the electronic device 21 being moved towards or away from the user's face. Where the electronic device 21 comprises a wearable electronic device 21 the movement could comprise the user moving their body. For example, if the electronic device 21 comprises a head set the movement could be the user rotating their head between different angular orientations. In such examples any movement of the apparatus could be of the order of centimeters.

In some examples of the disclosure both the first category of movement and the second category of movement may comprise rotation of the apparatus 1. The apparatus 1 comprise means for disambiguating between the different causes of the rotation.

In some examples of the disclosure movements that are comprised the first category may be smaller than movements that are comprised within the second category. In some examples any movement having a size above a given threshold may be determined to be within a second category while any movement having a size below the threshold could be determined to be within the first category. The sizes of the movement could relate to the angles of rotation, the distances travelled or any other suitable sizes. For example movements having a distance within the range of kilometers could be determined to be in the second category while movements having a distance within the range of centimeters could be determined to be in the first category.

In some examples of the disclosure movements that are comprised the first category may comprise movement of the apparatus 1 relative to the user of the apparatus 1. For example the first category of movement could comprise changes in position of the apparatus 1 relative to a user of the apparatus 1. This could comprise a user rotating a hand held device in their hands so that the angle of the screen relative to the user has changed. In some examples it could comprise a user moving an electronic device 21 closer to their face or further away. In such examples the second category of movement comprises movement of the apparatus 1 which does not change the position of the apparatus 1 relative to a user of the apparatus 1. For example if the user is sitting on a bus viewing content then the position of the apparatus 1 relative to the user will not change as the bus travels around a corner.

FIG. 4 illustrates an example of the disclosure in use. In the example of FIG. 4 the electronic device 21 comprises a hand held electronic device 21 such as a mobile telephone or tablet. The apparatus 1 and other components of the electronic device 21 may be provided within the apparatus 1 and so are not shown in FIG. 4.

When using the hand held electronic device 21 to view three dimensional content the user may be able to cause scrolling of the three dimensional content by rotating the hand held electronic device 21. For example, by tilting the hand held electronic device 21 they can change the visual scene that is represented on the display of the electronic device 21.

In the example of FIG. 4 the user is using the hand held electronic device 21 while travelling along the path indicated by arrow 41. For example, the user could be a passenger in a moving bus or other moving vehicle. In such examples the movement of the electronic device 21 will depend upon the frame of reference. The user could be stationary inside the bus so that, in terms of the frame of reference of the inside of the bus, there is no movement of the electronic device 21. However, as the bus is moving there would be movement of the electronic device to the frame of reference of a person outside of the bus.

FIG. 4 shows the electronic device 21 at a plurality of different locations 43 along the path 41. The different locations 43 may correspond to different points in time.

At the first location 43A and the second 43B the user has not changed the angular orientation of the electronic device 21. The user is holding the electronic device 21 in a steady position. In both the first location 43A and the second location 43B the electronic device 21 is arranged with the display at a perpendicular orientation to the path 41 of the bus. However the angular orientation of the electronic device 21 has changed slightly due to the path 41 of the bus. The example methods of FIGS. 3 and 4 may be used to determine that this change in angular orientation has not been caused by the user. This movement can be classed within a second category of movement so that there is no scrolling of the three dimensional content between the first location 43A and the second location 43B. The same visual scene may be represented on the display of the electronic device 21 in both the first location and the second location even though there has been a change in angular position of the apparatus 1.

In the third position 43C the user has tilted the electronic device 21 so that the display of the electronic device 21 is no longer at a perpendicular orientation to the path 41 of the bus. The example methods of FIGS. 3 and 4 may be used to determine that this change in angular orientation has been caused by the user. This movement can be classed within a first category of movement so that there is scrolling of the three dimensional content between the second location 43B and the third location 43C. A different visual scene may be represented on the display of the electronic device 21 in both the third location 43C compared to the visual scene displayed on the display in the second location 43B.

In the fourth position 43D the user has tilted the electronic device 21 back to the original position so that the display of the electronic device 21 moved back to a perpendicular orientation to the path 41 of the bus. This may cause a change in the visual scene represented on the display in the fourth position 43D relative to the visual scene that would have been shown in the third position 43C.

In the next three positions 43E, 43F and 43G the user is not moving the electronic device 21 themselves but the angular position of the electronic device 21 does change due to the bus moving along the path 41. The example methods may be used to control the scrolling of the three dimensional content so that this change in angular position does not change the visual scene represented on the display.

At the eighth position 43H the user has again tilted the apparatus 1 so that the display of the electronic device 21 is no longer at a perpendicular orientation to the path 41 of the bus. The example methods may be used to control the scrolling of the three dimensional content so that this change in angular position does change the visual scene represented on the display.

In the ninth position 43I the electronic device 21 is moved back to a position in which the display of the electronic device 21 is at a perpendicular orientation to the path 41 of the bus. This may cause a change in the visual scene represented on the display in the ninth position 34I compared to the visual scene that would have been shown in the eighth position 43H.

Therefore the examples of the disclosure enable movement of the apparatus 1 that has been caused by the user to be used to scroll through content while movement of the apparatus 1 that has been caused by movement of the bus can be ignored for the purposes of scrolling content. This provides for improved rendering of three dimensional content for the user.

Also in the example of FIG. 4 the electronic device 21 comprises a hand held electronic device 21. Other types of electronic device 21 could be used in other examples of the disclosure. For example, the electronic device 21 could be a head mounted display and the user could cause the visual scene that is displayed to be changed by rotating their head.

In the example of FIG. 4 the three dimensional content that is rendered comprises visual content. It is to be appreciated that in some examples of the disclosure the three dimensional content could comprise audio content instead of, or in addition to, the visual content.

FIG. 5 shows another example method according to examples of the disclosure. The example method could be implemented by apparatus 1 and electronic devices 21 as described. The method may be used by the apparatus 1 to determine whether the movement of the apparatus 1 falls within the first category or the second category.

At block 51 the path of an apparatus 1 is determined. The path of the apparatus 1 could be determined using one or more positioning sensors 25 such as GPS, HAIP sensors or any other type of sensors.

At block 53 the path data is compared to data obtained from one or more accelerometers 27. This compares the measured accelerations to the accelerations that would be expected for an apparatus 1 following the determined path. In some examples acceleration due to gravity may be ignored at this block.

If there is no discrepancy between the measured accelerations and the expected accelerations then the method returns to block 51. The movement of the apparatus 1 is considered to be caused by the travelling of the user rather than by an intentional input. This movement can be classed as a second category movement and does not cause any scrolling of the three-dimensional content.

If there is a discrepancy between the accelerations that are measured and the expected accelerations then the method moves to block 55. If there is a discrepancy between the accelerations that are measured and the expected accelerations then the movement of the apparatus 1 is considered to be caused by an intentional input by the user. This movement can be classed as a first category movement and will cause any scrolling of the three-dimensional content.

At block 55 the apparatus 1 detects the turn that caused discrepancy. The apparatus 1 may detect which axes the apparatus 1 has been rotated around and the magnitude of that rotation.

Once the turn has been detected, at block 57 the apparatus 1 scrolls through the three dimensional content according to the turn detected at block 55. This may cause the audio and/or visual scene that is being rendered to change according to the rotation of the apparatus 1.

In the example of FIG. 5 the movement of the apparatus 1 that is detected comprises a rotation of the apparatus 1. It is to be appreciated that other movements of the apparatus 1 could be detected and used to scroll through content in other examples of the disclosure. For example, where the electronic device 21 is a hand held device the user could move the device from side to side or up and down without changing the angular orientation of the user. These movements could also causes changes in the visual and/or audio scene that is rendered by the electronic device 21.

FIGS. 6A to 6D illustrate another example electronic device 21 in use. The electronic device 21 comprises a hand held device such as mobile telephone. The user 63 can move the hand held device 21 between different orientations.

In the example of FIGS. 6A to 6D the electronic device 21 is being used to render both two dimensional content and three dimensional content simultaneously. In the example of FIGS. 6A to 6D the two dimensional content 69 and the three dimensional content 65 are both visual content which is displayed on a display 61 of the electronic device 21.

In the example of FIGS. 6A to 6D the three dimensional content 65 comprises a virtual reality movie theatre. This comprises a three dimensional virtual space representing the inside of a movie theatre. This comprises rows of seats and a virtual screen 67. This content is three dimensional in that the user can change the visual scene that is displayed on the display. For example, by tilting their electronic device 21 the user 63 may be able to view the different parts of the movie theatre.

The two dimensional content 69 may comprise images that can be displayed on the virtual screen. The two dimensional content 69 is different to the three dimensional content 65 because the user 63 cannot change the visual scene represented in the two dimensional content 69. The two dimensional content 69 may be shown from a fixed viewpoint which does not change as the electronic device 21 is moved. This recreates the experience of viewing a film at a movie theatre.

Figure 6A:
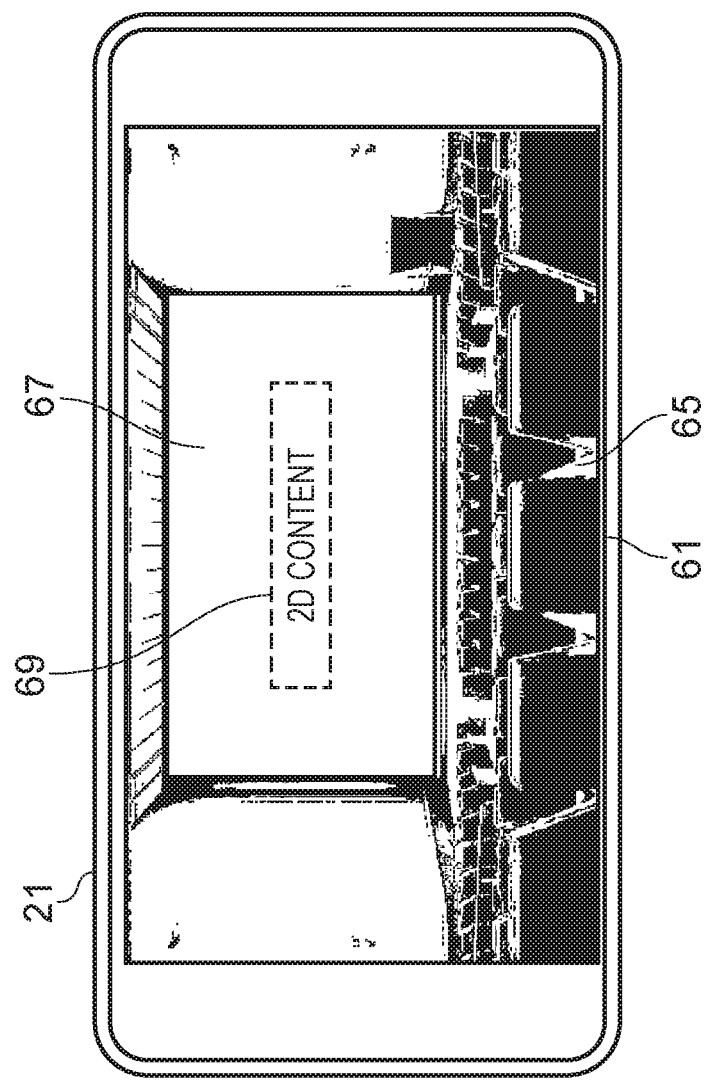
Figure 6A:
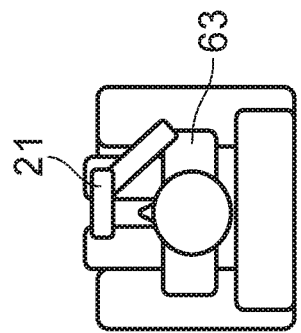

In the example of FIG. 6A the user 63 is viewing the combined two dimensional content 69 and three dimensional content 65 on the electronic device 21. The user 61 is seated in a chair and is holding the electronic device 21 in a position in front of their face. The two dimensional content 69 is displayed in a central position of the display 61. The three dimensional content 65 is displayed around the edges of the display 61.

In FIG. 6A if the user 63 moves their electronic device 21, and it is determined to be movements within the first category, this will cause the visual scene displayed on the display 61 to be changed. This may move the position of the virtual screen 67 to a different position so that it is not in the centre of the display 61 and/or may enable the user 63 to view other parts of the movie theatre such as other virtual users within the theatre.

Figure 6B:
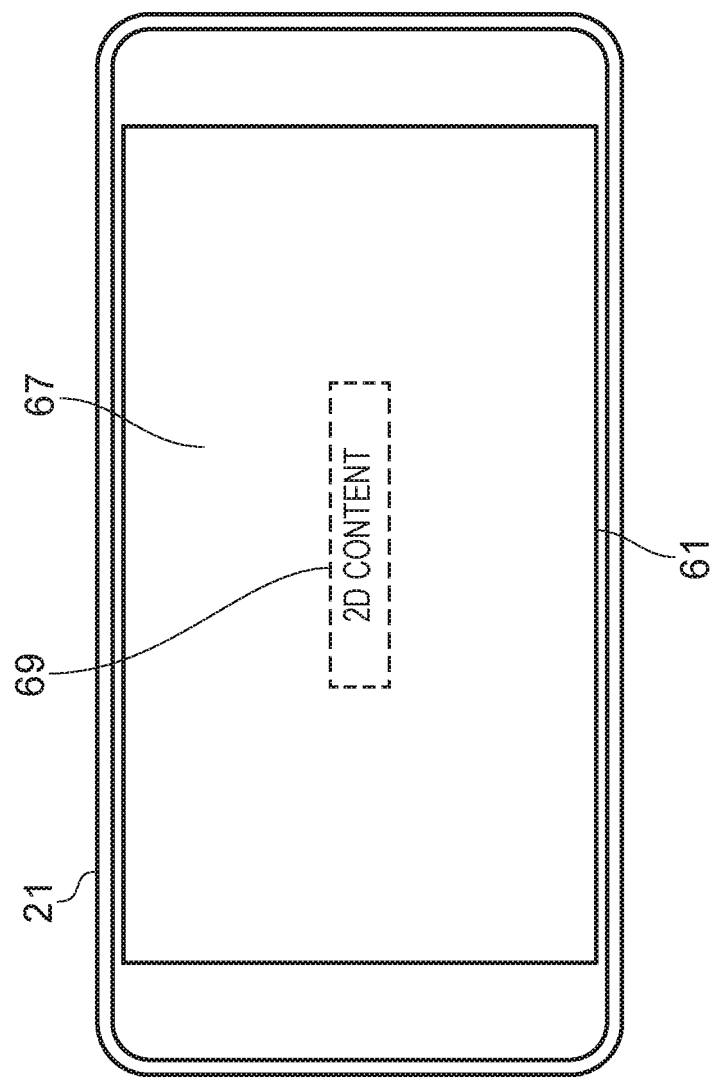
Figure 6B:
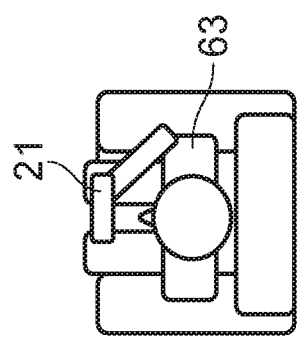

In FIG. 6B it is determined that the viewing direction of the user 63 is aligned with virtual screen 67 and the two dimensional content 69. Any suitable means may be used to determine that the viewing direction of the user 63 is aligned with virtual screen 67 and the two dimensional content 69. In some examples this may be determined if the virtual screen 67 and the two dimensional content 69 and displayed in the centre of the display 61 and the electronic device 21 is held in a steady position in front of the user 63. In other examples, gaze tracking, or any other suitable means could be used to make this determination.

Once it has been determined that the viewing direction of the user 63 is aligned with virtual screen 67 and the two dimensional content 69 the apparatus 1 controls the display 61 to fix the virtual screen 67 and the two dimensional content 69 onto the display. The fixing of the virtual screen 67 and the two dimensional content 69 onto the display may comprise the zooming in and/or zooming out of the two dimensional content 69 so that the two dimensional content fills all of, or almost all of the display 61.

When the two dimensional content 69 is fixed onto the display 61 this may restrict scrolling through the three dimensional content 65. For example, if the two dimensional content 69 has been fixed onto the display then movement of the electronic device 21 may be ignored so as not to cause any scrolling of the three dimensional content 65 and to prevent the two dimensional content 69 being moved of the display. In this example the second category of movements could comprise any movement that is made when the two dimensional content 69 is in a fixed arrangement.

Figure 6C:
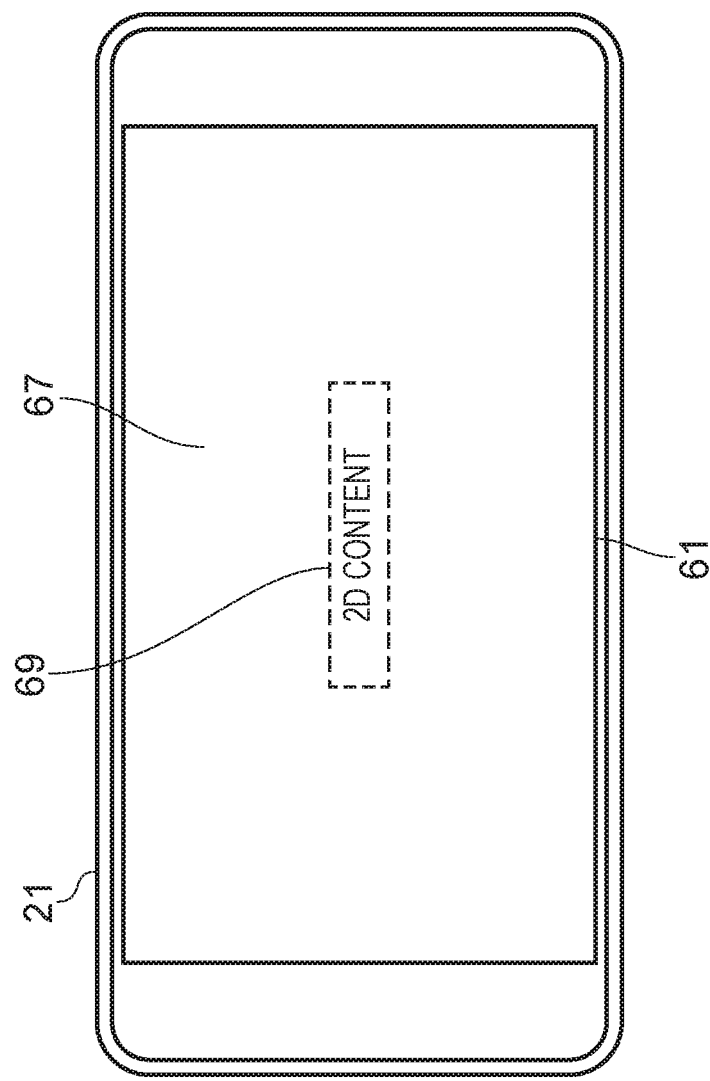
Figure 6C:
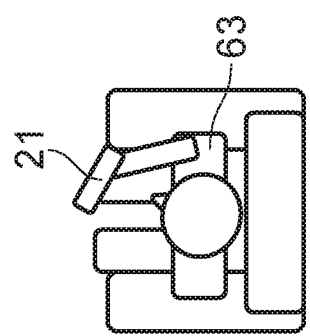

In the example of FIG. 6C the user 61 has moved the electronic device 21. The movement of the electronic device 21 has comprised the electronic device 21 being moved to a different angular position. The apparatus 1 may determine the apparatus has been moved to a new angular position. However as the two dimensional content 69 is in a fixed arrangement the movement may be classed as a second category of movement and the apparatus 1 does not cause scrolling of the three dimensional content 65. This ensures that the two dimensional content 69 remains in the same position on the display 61 even though the electronic device 21 has moved.

Figure 6D:
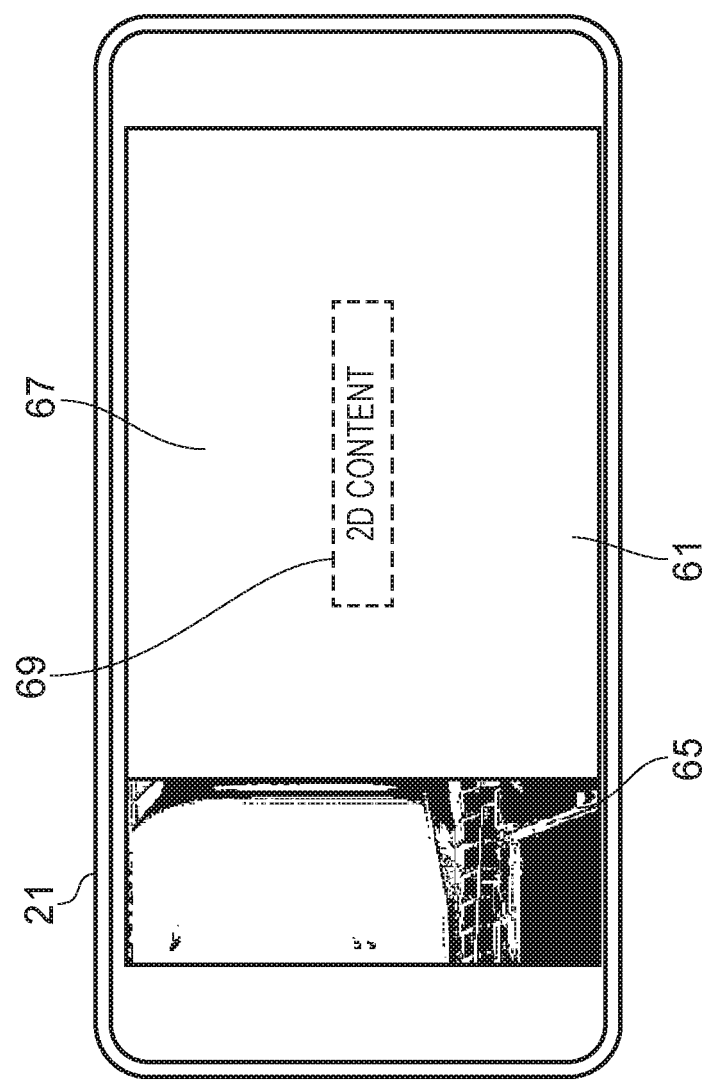
Figure 6D:
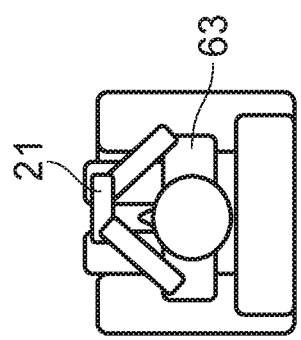

In the example of FIG. 6D the user 61 makes a user input to move the two dimensional content 69 out of the fixed arrangement. In the example of FIG. 6D the user input comprises a swipe or other actuation of the display 61. Other types of user input could be used in other examples of the disclosure.

Once the two dimensional content 69 has been moved out of the fixed arrangement movement of the electronic device 21 will cause scrolling of the three dimensional content 65. If movement of the apparatus 1 is detected once the two dimensional content 69 has been moved out of the fixed arrangement then this will be determined to be movement within the first category and will cause scrolling of the three dimensional content 65. As shown in FIG. 6D scrolling of the three dimensional content 65 may cause the position of the virtual screen 67 and the two dimensional content 69 to be changed on the display and the amount of three dimensional content 65 that is shown to be changed. In the example of FIG. 6D the virtual screen 67 and the two dimensional content 69 has moved towards the right which enables some three dimensional content 65 to be shown on the left hand side of the display 61.

In the example of FIGS. 6A to 6D the user input that is used to move the two dimensional content from the fixed position comprises an input made via a touch sensitive display 61. It is to be appreciated that other types of user input could be made in other examples of the disclosure. For instance, where the electronic device 21 comprises a wearable device the electronic device 21 might not comprise a touch sensitive display 21. In such examples the user input could be a gesture comprising movement of the user's arms, an audio input or any other suitable type of input.

Examples of the disclosure therefore enable the content being rendered to be, at least temporarily fixed so as to avoid unwanted scrolling through the content. The unwanted scrolling that is avoided could be scrolling caused by movement of the electronic device 21 that has not been caused by the user 63. In some examples the unwanted scrolling could be scrolling that is unwanted because the user 61 has fixed on a particular portion of the content being rendered.

The term "comprise" is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising processing circuitry; and memory circuitry including computer program code, the memory circuitry and the computer program code configured to, with the processing circuitry, cause the apparatus to:
   enable three dimensional content to be rendered;
   determine movement of the apparatus and a category of movement of the apparatus, wherein the apparatus is caused to determine movement by differentiating between movement of the apparatus intended to cause scrolling of the three dimensional content and other types of movement of the apparatus; and
   control scrolling through the three dimensional content, wherein if the movement of the apparatus is within a first category in which the movement is intended to cause scrolling of the content, the three dimensional content is scrolled to correspond to the movement of the apparatus, and
   if the movement of the apparatus is within a second category in which the movement is not intended to cause scrolling of the content, the movement is ignored such that the three dimensional content is not scrolled and there is no change in the content that is rendered in response to the movement of the apparatus,
   wherein the apparatus is caused to determine the category of movement by determining a path of the apparatus, comparing expected accelerations for an apparatus following the determined path to measured accelerations of the apparatus and comparing rotational or translational movement of the apparatus to a given threshold,
wherein the category of movement determined for the apparatus is determined based at least in part on the comparison of expected accelerations for an apparatus following the determined path to measured accelerations of the apparatus and, in an instance in which the comparison of the expected accelerations is indicative of the first category of movement, the category of movement is also determined based at least in part on the comparison of the rotational or translational movement to the given threshold with a rotational or translational movement that is above the given threshold being determined to be within the second category such that the movement is ignored and the three dimensional content is not scrolled and with a rotational or translational movement that is below the given threshold being determined to be within the first category such that the three dimensional content is scrolled to correspond to the movement of the apparatus.

2. An apparatus as claimed in claim 1 wherein the second category of movement corresponds to the accelerations caused by the apparatus following the determined path.

3. An apparatus as claimed in claim 1 wherein the first category of movement corresponds to accelerations that are not caused by the apparatus following the determined path.

4. An apparatus as claimed in claim 1 wherein the determined path corresponds to a path of a moving vehicle within which the apparatus is located.

5. An apparatus as claimed in claim 1 wherein the movement of the apparatus in both the first category and the second category comprises a change in orientation of the apparatus.

6. An apparatus as claimed in claim 1 wherein the first category of movement comprises changes in position of the apparatus relative to a user of the apparatus and the second category of movement comprises movement of the apparatus which does not change the position of the apparatus relative to a user of the apparatus.

7. An apparatus as claimed in claim 1 wherein the memory circuitry and the computer program code are configured to, with the processing circuitry, cause the apparatus to enable two dimensional content and three dimensional content to be displayed simultaneously and control the scrolling of the three dimensional content so that the two dimensional content continues to be displayed if the movement of the apparatus is within the second category.

8. An apparatus as claimed in claim 7 wherein the memory circuitry and the computer program code are configured to, with the processing circuitry, cause the apparatus to fix the two dimensional content in position on a display.

9. An apparatus as claimed in claim 7 wherein the memory circuitry and the computer program code are configured to, with the processing circuitry, cause the apparatus to detect a user input and in response to the detected user input move the two dimensional content from a fixed position.

10. An apparatus as claimed in claim 1 wherein the memory circuitry and the computer program code are configured to, with the processing circuitry, cause the apparatus to classify movement of the apparatus as the first category or the second category.

11. An apparatus as claimed in claim 1 wherein the three dimensional content comprises visual content and the rendering of the three dimensional content comprises displaying the images on one or more displays.

12. An electronic device comprising an apparatus as claimed in claim 1.

13. A method comprising:
enabling three dimensional content to be rendered by an apparatus;
determining movement of the apparatus and a category of movement of the apparatus, wherein determining movement comprises differentiating between movement of the apparatus intended to cause scrolling of the three dimensional content and other types of movement of the apparatus; and
controlling scrolling through the three dimensional content, wherein if the movement of the apparatus is within a first category in which the movement is intended to cause scrolling of the content, the three dimensional content is scrolled to correspond to the movement of the apparatus, and
wherein if the movement of the apparatus is within a second category in which the movement is not intended to cause scrolling of the content, the movement is ignored such that the three dimensional content is not scrolled and there is no change in the content that is rendered in response to the movement of the apparatus,
wherein determining the category of movement comprises determining a path of the apparatus, comparing expected accelerations for an apparatus following the determined path to measured accelerations of the apparatus and comparing rotational or translational movement of the apparatus to a given threshold, and
wherein the category of movement determined for the apparatus is determined based at least in part on the comparison of expected accelerations for an apparatus following the determined path to measured accelerations of the apparatus and, in an instance in which the comparison of the expected accelerations is indicative of the first category of movement, the category of movement is also determined based at least in part on the comparison of the rotational or translational movement to the given threshold with a rotational or translational movement that is above the given threshold being determined to be within the second category such that the movement is ignored and the three dimensional content is not scrolled and with a rotational or translational movement that is below the given threshold being determined to be within the first category such that the three dimensional content is scrolled to correspond to the movement of the apparatus.

14. A method as claimed in claim 13 wherein the second category of movement corresponds to the accelerations caused by the apparatus following the determined path.

15. A method as claimed in claim 13 wherein the first category of movement corresponds to accelerations that are not caused by the apparatus following the determined path.

16. A method as claimed in claim 13 wherein the determined path corresponds to a path of a moving vehicle within which the apparatus is located.

17. A method as claimed in claim 13 wherein the movement of the apparatus in both the first category and the second category comprises a change in orientation of the apparatus.

18. A method as claimed in claim 13 wherein the first category of movement comprises changes in position of the apparatus relative to a user of the apparatus and the second category of movement comprises movement of the apparatus which does not change the position of the apparatus relative to a user of the apparatus.

19. A method as claimed in claim 13 wherein enabling three dimensional content to be rendered comprises enabling two dimensional content and three dimensional content to be displayed simultaneously, and controlling scrolling through the three dimensional content comprises controlling the scrolling through the three dimensional content so that the two dimensional content continues to be displayed if the movement of the apparatus is within the second category.

20. A non-transitory computer-readable storage medium comprising computer program instructions that, when executed by processing circuitry, cause:

enabling three dimensional content to be rendered by an apparatus;

determining movement of an apparatus and a category of movement of the apparatus, wherein determining movement comprises differentiating between movement of the apparatus intended to cause scrolling of the three dimensional content and other types of movement of the apparatus;

controlling scrolling through the three dimensional content, wherein if the movement of the apparatus is within a first category in which the movement is intended to cause scrolling of the content, the three dimensional content is scrolled to correspond to the movement of the apparatus, and wherein, if the movement of the apparatus is within a second category in which the movement is not intended to cause scrolling of the content, the movement is ignored such that the three dimensional content is not scrolled and there is no change in the content that is rendered in response to the movement of the apparatus, wherein determining the category of movement comprises determining a path of the apparatus, comparing expected accelerations for an apparatus following the determined path to measured accelerations of the apparatus and comparing rotational or translational movement of the apparatus to a given threshold, and wherein the category of movement determined for the apparatus is determined based at least in part on the comparison of expected accelerations for an apparatus following the determined path to measured accelerations of the apparatus and, in an instance in which the comparison of the expected accelerations is indicative of the first category of movement, the category of movement is also determined based at least in part on the comparison of the rotational or translational movement to the given threshold with a rotational or translational movement that is above the given threshold being determined to be within the second category such that the movement is ignored and the three dimensional content is not scrolled and with a rotational or translational movement that is below the given threshold being determined to be within the first category such that the three dimensional content is scrolled to correspond to the movement of the apparatus.

* * * * *